United States Patent
Roth et al.

(10) Patent No.: US 6,991,766 B2
(45) Date of Patent: Jan. 31, 2006

(54) APPARATUS FOR AUTOMATED SYNTHESIS

(75) Inventors: Gregory Paul Roth, New Milford, CT (US); Roy Lewis Barr, Carlsbad, CA (US); Junefredo Fajardo Apon, San Diego, CA (US); Steven Russell Bush, Oceanside, CA (US); Thomas James Baiga, Oceanside, CA (US)

(73) Assignee: Boehringer Ingelheim Pharmaceuticals, Inc., Ridgefield, CT (US)

( * ) Notice: Subject to any disclaimer, the term of this patent is extended or adjusted under 35 U.S.C. 154(b) by 331 days.

(21) Appl. No.: 10/622,300

(22) Filed: Jul. 18, 2003

(65) Prior Publication Data

US 2005/0013748 A1  Jan. 20, 2005

(51) Int. Cl.
*B01J 19/00* (2006.01)
*B01L 3/00* (2006.01)

(52) U.S. Cl. .................. 422/130; 422/64; 211/77; 366/216; 220/211

(58) Field of Classification Search ............. 422/130, 422/64; 211/77; 366/216; 220/211
See application file for complete search history.

(56) References Cited

U.S. PATENT DOCUMENTS

| | | | |
|---|---|---|---|
| 4,547,340 A | * | 10/1985 | Sanuki et al. ............... 422/116 |
| 4,746,490 A | | 5/1988 | Saneii |
| 4,981,801 A | | 1/1991 | Suzuki et al. |
| 5,147,608 A | | 9/1992 | Hudson et al. |
| 5,296,911 A | | 3/1994 | Weyrauch et al. |
| 5,314,825 A | | 5/1994 | Weyrauch et al. |
| 5,503,805 A | | 4/1996 | Sugarman et al. |
| 5,526,835 A | | 6/1996 | Olechow |
| 5,609,826 A | | 3/1997 | Cargill |
| 5,746,982 A | | 5/1998 | Saneii et al. |
| 5,876,668 A | | 3/1999 | Kawashima et al. |
| 6,264,891 B1 | | 7/2001 | Heyneker et al. |
| 6,420,123 B1 | | 7/2002 | Furka |

OTHER PUBLICATIONS

John F. Cargill, et al; New Methods in Combinatorial Chemistry-Robotics and parallel Synthesis; Current Opinion in Chemical Biology—1997: 1, pp 67-71.
John F. Cargill, et al; Automated Combinatorial Chemistry on Solid Phase; LRA, vol. 8, pp 139-148.

* cited by examiner

*Primary Examiner*—Jill Warden
*Assistant Examiner*—Natalia Levkovich
(74) *Attorney, Agent, or Firm*—Michael P. Morris; Anthony P. Bottino; Philip I. Datlow

(57) ABSTRACT

Disclosed is an apparatus for automated synthesis containing a shaker deck with a plurality of reaction blocks containing a plurality of reaction wells, an arm containing an array of extending units capable of actuating physical steps along a plurality of axes of each reaction block, each reaction block being situated on a turntable, each turntable being further capable of rotating the reaction block along a central axis. Also disclosed are methods of preparing a peptide, oligonucleotide an small molecules using the apparatus.

12 Claims, 4 Drawing Sheets

APPARATUS FOR AUTOMATED SYNTHESIS

TECHNICAL FIELD

This invention relates automated synthesizers useful in combinatorial chemistry, peptide and oligonucleotide synthesis.

BACKGROUND INFORMATION

Automated synthesizers capable of performing continuous reactions are particularly useful in combinatorial chemistry. These synthesizers include a robot liquid handling device for delivering chemical reactants to wells in a reaction block for stepwise syntheses.

U.S. Pat. No. 5,746,982 discloses an apparatus for automated synthesis wherein one or more robot arms mounted on a track dispenses reagents at x,y axes located on a reaction block containing a plurality of reaction wells. The reaction block described therein is mounted on a stationary table optionally having an orbital mixer. U.S. Pat. No. 6,264,891 described an apparatus for concurrent synthesis wherein reaction blocks are mounted in fixed positions on a turntable in a concentric circle equidistant from the rotatable axis. The turntable rotates in an incremental stepwise fashion to docking stations which perform physical steps in sequence. Among the limitations to the aforementioned devices is that the incremental physical steps performed on the reaction wells is one dimensional for a series of rows along an x,y axis containing wells. Lacking in the art is an apparatus which can perform synthetic physical steps for both rows and columns, for one or more reaction blocks each mounted on a turntable.

BRIEF SUMMARY OF THE INVENTION

It is therefore an object of the invention to provide an apparatus for automated chemical synthesis having a plurality of reaction blocks each situated on a turntable and further optionally having an arm containing an array of extending units capable of actuating physical steps for both rows and columns. Rather than one continuous sequential reaction, the apparatus according to the invention enables one or more separate reactions to continuously proceed in parallel by possessing a plurality of actuated axes by virtue of rotational movement of one or more reaction blocks and positioning of a slidable arm containing an array of extending units capable of actuating physical steps. The apparatus is suitable for combinatorial chemical synthesis for a variety of solid phase and solution phase syntheses of small chemical molecular entities and macromolecules such as peptides and nucleic acids. The apparatus includes a platform (also referred to hereafter as a 'shaker deck') which contains a plurality of turntables, the turntables each contain a mounted reaction block. Each turntable can rotate its reaction block around a center axis 90 degrees. The reaction blocks are those known in the art and comprise a plurality of reaction wells each capable of: accepting reagent delivery into the well, drainage, and utilizing sensor devices to detect physical and chemical data as the reaction progresses. Located above each shaker deck is an arm possessing one or more extending units, such as dispensing syringes, for actuating a physical step as further described below. The arm is located above all shaker decks (the entire platform is its horizontal space) and can be positioned above each shaker deck and reaction block. The arm is capable of movement along three axes, an x,y along the horizontal plane, and a perpendicular z axis. Each incremental step situates a particular reaction well within a reaction block by movement in the horizontal axes effected by lateral movement of the apparatus arm, and/or actuated by rotation of the turntable. The vertical z axis provides for height adjustment movement of the arm for physical steps such as fluid dispensing, separation, vacuum, extraction and aspiration. The three actuated axes as described herein can be, and are preferably, controlled by a programmable computer.

The reaction steps generally include providing a plurality of reaction wells containing reagents for liquid phase chemistry or solid phase. Solid phase included for example, the core of the molecule to be derivatized attached to a solid support, or where one or more of the reagents, catalysts or purification scavengers is attached to a support. The reaction wells are contained in a reaction block, the well is translated in the x or y horizontal plane to be situated for a physical step, for example to receive fluid delivery, by rotational movement of the turntable and the translation of extending unit. Reaction is facilitated in each well by sequential reagent delivery, with subsequent independent steps for dissolution, separation, extraction, resin delivery, resin washing, resin cleavage, filtration, a means for agitation, temperature and pressure controls and detection. Accordingly, the apparatus as described herein possesses one or more extending units, each containing a fluid delivery system and fluid drainage system, said systems being capable of solvent, resin and reagent transfers or dissolution, and possessing means for extraction and washing. The apparatus also accordingly contains turntables having a universal docking system for a diversity of reaction blocks, said turntables being capable of rotation and orbital movement. The apparatus further accordingly provides reaction blocks containing a fluid delivery system, fluid separation system and fluid drainage system. Each system also possess temperature and pressure controlling means, and a means of liquid sensing for pipette based separation of liquid phases of different densities. Facilitation of the reaction can be further achieved by an orbital shaker device.

In solid phase combinatorial chemistry, chemical libraries are created by covalent attachment of a diversity of reactants to a parent molecule attached to a solid resin support. Subsequent reagents are added and may be washed away upon completion. The desired product molecule is subsequently cleaved under suitable conditions followed by washing of the resin and isolation. During the automated synthesis, the apparatus may provide temperature, pressure controls, and agitation at the reaction block.

Each physical step in the automated synthesis provided by the apparatus according to the invention can be performed by orienting one or more reaction wells within the reaction block with the arm situated along the appropriate coordinates by actuation of one or more of the x, y and z axes. Each arm contains one or more extending units with means capable of vertical movement, and means for:

reagent delivery, separation, liquid drainage, liquid/liquid extraction, resin washing/workup, resin dispensing, resin cleavage, solvent transfers, reagent transfers, online reagent dissolution, temperature and pressure controlling, and liquid sensing for pipette based separation of liquid phases of different densities.

DETAILED DESCRIPTION OF THE INVENTION

Figure 1:
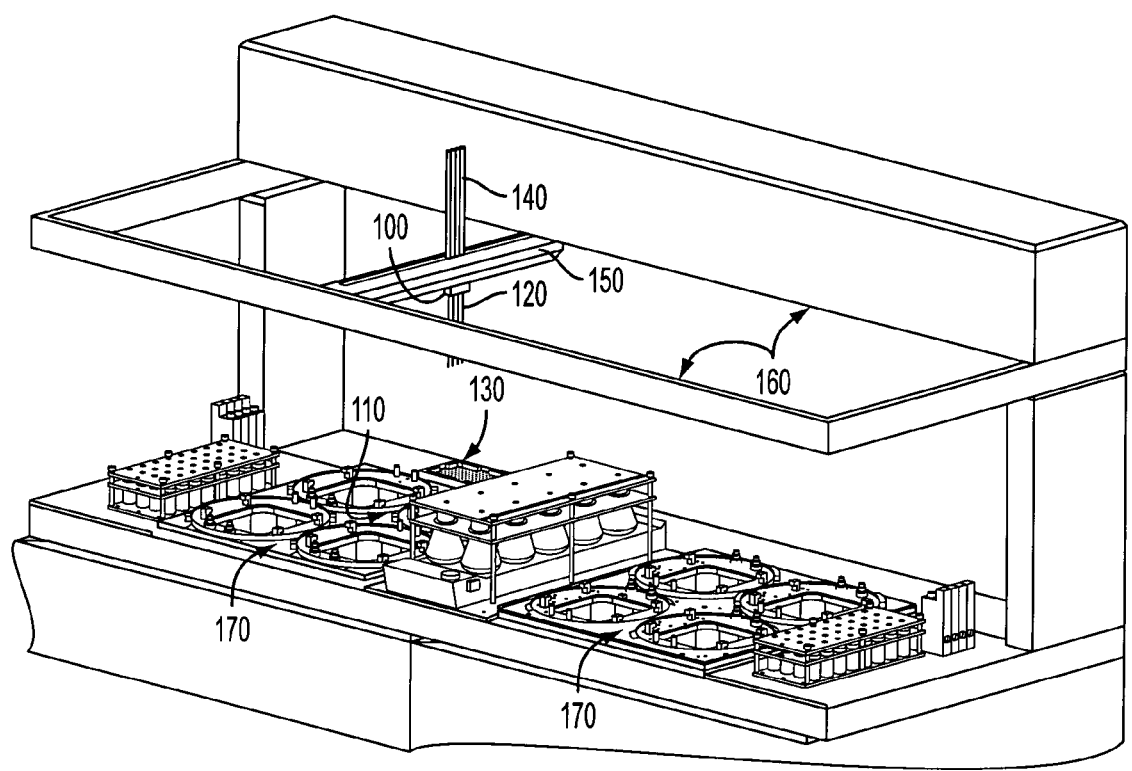
FIG. 1 depicts the apparatus of the invention.

In one embodiment, the invention provides an apparatus for automated synthesis comprising a shaker deck comprising a plurality of reaction blocks containing a plurality of reaction wells, each reaction block being situated on a turntable, each turntable being further capable of rotating the reaction block along a central axis.

In another embodiment, the invention provides an apparatus for automated synthesis comprising a shaker deck comprising a plurality of reaction of reaction blocks containing a plurality of reaction wells, an arm comprising an array of extending units capable of actuating physical steps along a plurality of axes of each reaction block, each reaction block being situated on a turntable, each turntable being further capable of rotating the reaction block along a central axis.

In another embodiment, the invention provides an apparatus for automated synthesis comprising a shaker deck comprising a plurality of reaction blocks containing a plurality of reaction wells, an arm comprising an array of extending units capable of actuating physical steps along a plurality of axes of the reaction block said arm being situated on a slidable mount having bi-directional and lateral movement, the reaction block being situated on a turntable, each turntable being further capable of rotating the reaction block up to 90 degrees along a central axis.

In each of the above mentioned embodiments of the apparatus according to the invention, there are preferably four reaction blocks in a shaker deck, each reaction block mounted on a turntable having a universal mount for each type of reaction block, the turntable is capable of rotating its reaction block up to 90 degrees around a center axis, said shaker deck further comprising shaker orbital agitation means and means for performing one or more steps selected from drainage, temperature control, pressure control, detection means for physical and chemical properties of products and reactants.

Other non-limiting examples of embodiments within the scope of the invention are provided herein-below.

All technical and scientific terms used in this application shall be understood to have their meaning commonly understood by those of ordinary skill in the art.

The 'physical steps' according to the invention include: reagent delivery, separation, liquid drainage, liquid/liquid extraction, resin washing/workup, resin dispensing, resin cleavage, solvent transfers, reagent transfers, online reagent dissolution, temperature and pressure controlling, and liquid sensing for pipette based separation of liquid phases of different densities. Means for implementing such physical steps are those known in the art, such as those described by Cargill et. al, Automated Combinatorial Chemistry on Solid Phase. LRA (8) 139–148 (1996); U.S. Pat. Nos. 4,746,490; 4,981,801; 5,147,608; 5,296,911; 5,503,805; 5,526,835; 5,609,826; 5,746,982; 5,314,825; 5,876,668; 6,264,891 and 6,420,123.

Automated synthesis according to the invention shall include combinatorial chemistry, peptide and oligonucleotide synthesis, parallel organic synthesis using both solid phase and solution phase reagents and reactions.

All citations made in this application are each incorporated herein by reference in their entirety.

II. Apparatus

A. Operating Parts

As described herein above, the arm unit is capable of actuating a plurality of physical steps of which a non-limiting example is reagent delivery.

Figure 2:
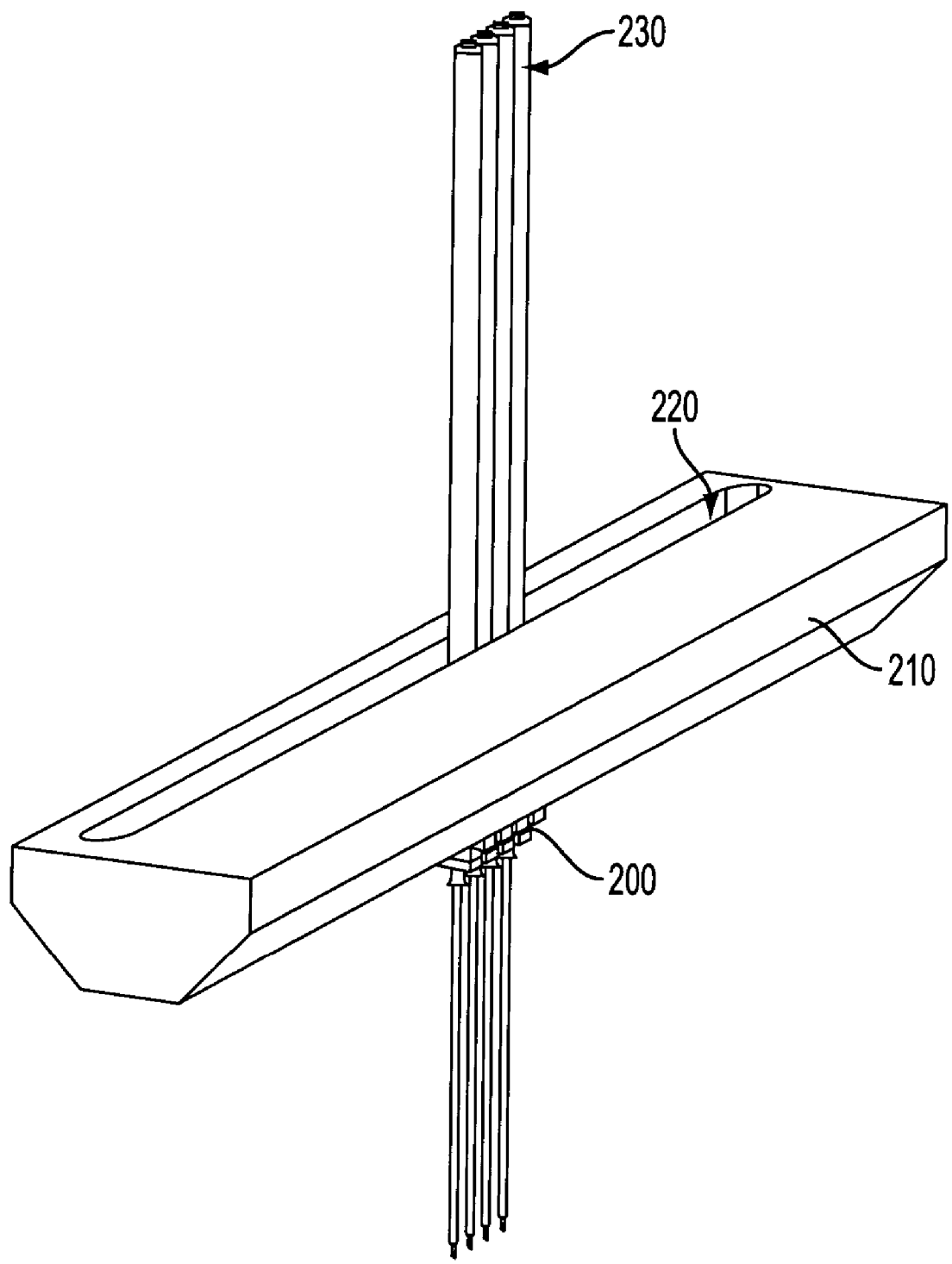
FIG. 2 depicts an arm mount.

Reagent delivery is achieved by a fluid delivery system that delivers fluid to the wells of the reaction block docked on each turntable. Referring to FIGS. 1 and 2, the fluid delivery system includes, for example, arm unit 100 positioned above turntable 110. The assembly arm comprising a plurality of extending units comprising modules 120 such as syringes capable of performing physical steps. In one embodiment, the module 120 is a dispensing module comprising a dispensing head 200 adapted to deliver an amount of fluid to a well in the reaction block 130 docked to the turntable. The system includes one or more tube ends such as fluid lines 140, 230 each fluid line connecting a fluid dispenser to the dispensing head. A displacement pump providing positive pressure can deliver liquid to the dispenser head.

Arm mount 150, 210 also effectuates 2 dimensional movement in the planar x,y coordinates of arm unit 100 by slidable lateral movement means located in arm unit slot 220. The arm mount can also be translated in a direction perpendicular to the slot by means capable of two way movement of the entire arm mount across the apparatus on frontal and rear support brackets 160 possessing slidable means which may be mechanized, and computer controlled. The dispenser head motion, by movement of arm 100 and turntable 110, in relation to the reaction wells can be radial, from outer diameter to inner diameter, linear movement to the next well in the rotation, or diagonal, a combination of radial and linear. The dispenser head hovers above the center of each well designated by the synthesis program. If the program instructs the dispenser head that fluid is to be delivered to a particular well, arm 100 lowers along the vertical z axis to deliver the fluid by syringe.

The module 120 may comprise a plurality of tube ends 230 for additional physical steps to be performed. All tube ends feed into modules 120 pointing downward towards the well. For example, a plurality of fluid heads may deliver reagents to a single well sequentially at a single step, or a plurality of wells at a single step.

Liquid drainage is achieved by a drain system that removes liquid from the wells by any means. In one embodiment, the apparatus is adapted to drain liquid by top emptying or bottom emptying. In one embodiment, the drainage is achieved by bottom emptying wherein the lower portion of the reaction block defines a manifold provided with a plurality of waste conduits as described in U.S. Pat. No. 5,746,982, incorporated herein by reference. Means for drainage include any means for introducing a difference in pressure between the atmosphere above the reaction liquid and the atmosphere below the reaction liquid such as: positive pressure being introduced by the tube ends 230 causing the well contents to flow down the pressure gradient, a vacuum pump may be connected to the manifold introducing a positive difference in pressure causing the well contents to flow down the pressure gradient and thereby being flushed from the well.

Means for liquid/liquid extraction, resin washing/workup, resin dispensing, resin cleavage, solvent transfers, reagent transfers, online reagent dissolution, temperature control, pressure controlling, liquid sensing for pipette based separation of liquid phases of different densities are all those known in the art and are within the scope of the invention.

The following examples are provided by way of illustration, not limitation.

A. Introduction

Figure 3:
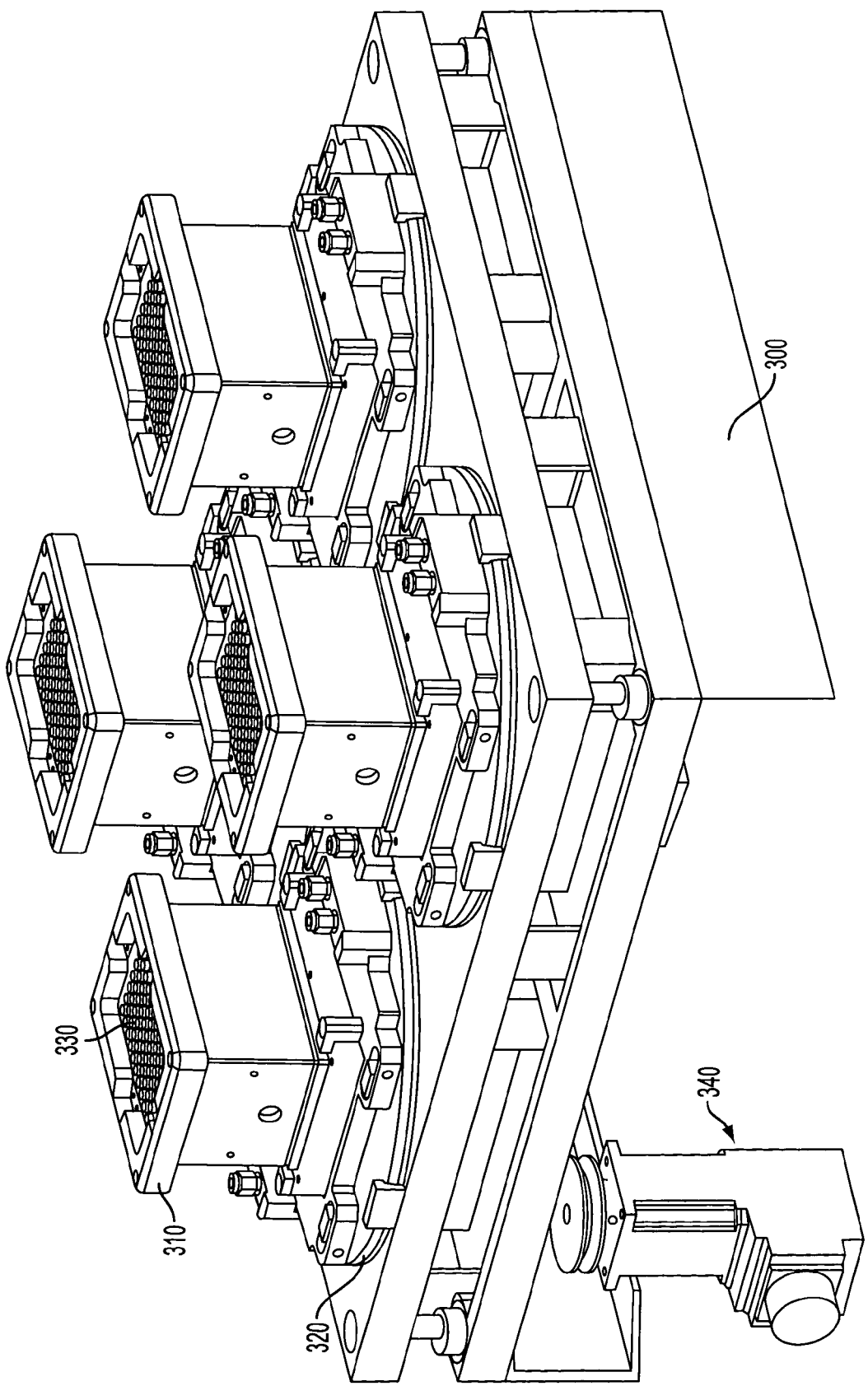
FIG. 3. depicts a shaker deck system.
Figure 4:
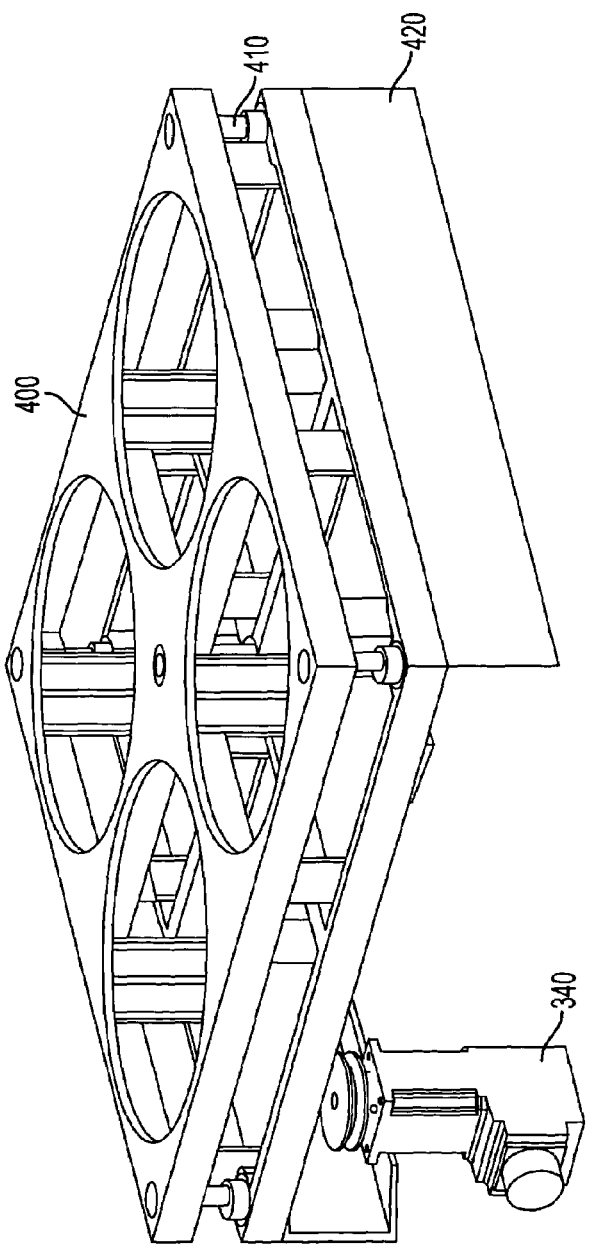
FIGS. 4 and 5 depict the interior view of the shaker deck system.
Figure 5:
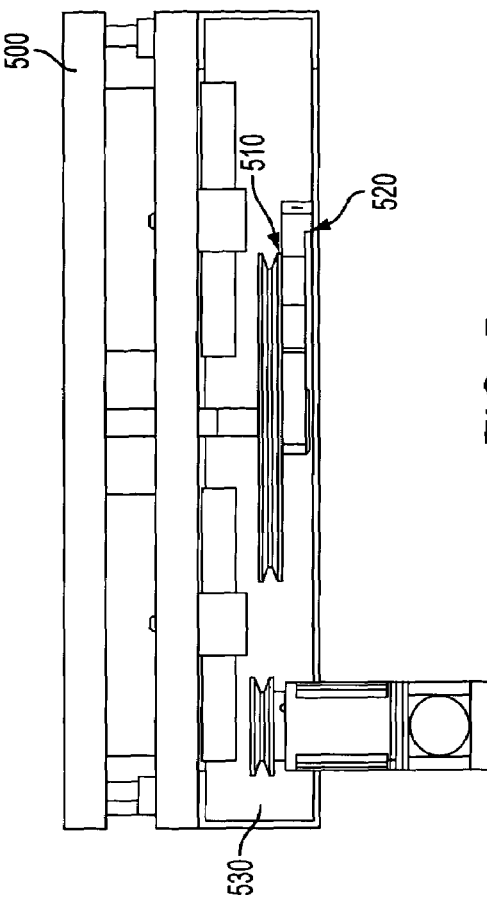

Referring to FIG. 3 showing a shaker deck 300. One or more shaker decks can be installed and operated in the apparatus shown in FIG. 1. On the shaker deck, a plurality of reaction blocks 310 (130 as shown in FIG. 1) are each individually mounted on a turntable 320, said turntables are in turn mounted within shaker deck 300. FIGS. 4 and 5 provide a further detailed description of an interior view of the shaker deck. Housing 400 supports turntables 320, said housing is fixed along the shaft of moveable support cams 410 at one longitudinal end, which in turn are anchored to housing 420 at the other longitudinal end. FIG. 5 shows another internal view of the shaker deck where housing 500 (same as 400 in FIG. 4) can be shaken by means such as drive pulley 510 where said rotation is translated to a shaking motion via a cam or eccentric translation being performed evenly by means of counter balance 520. Pulley 530 part of the shaker motor is also shown.

All chemical protocols are divided into reaction steps which, in turn, are divided into physical steps. The physical steps include delivering fluid to a well 330, draining fluid from a well, washing a well, and incubating a well. Incubating can consist of some or all of controlling the contents of the atmosphere and the pressure of a well, controlling the temperature of a well, and agitating (mixing) a well as provided by means such as shaker motor 340. Washing involves adding fluid to a well, agitating in most cases, and subsequently draining the well. This can be performed in sequential stations dedicated to fluid delivery, agitation, and fluid draining, or by combining all three activities at the same station. More specifically, a fluid delivery module can provide fluid delivery to a well, optionally followed by agitation means, and a vacuum line connects to a draining module, all attached by various means to the well. Temperature control, atmosphere control, and pressure control are also connected to the well via various methods. For example, a reaction step could involve adding liquid comprising reactant to a well, incubating the well for a specified period of time while agitating at a specific temperature and pressure, draining the liquid from the well, and washing the well at least once.

Once all the reaction steps in the protocol are divided into physical steps, the number of steps is adjusted to the number of wells in the apparatus which depends on the specific reaction well modules which are mounted to the apparatus, e.g, 8 reaction array modules consisting of 48 wells each for a total of 384 total wells. For example, a wash step may actually consist of delivering washing liquid to all 384 wells followed by agitation of each reaction array module, followed by draining of all wells. Then, the apparatus may be set up and prepared to deliver the appropriate reagents to the designated wells in the desired order as well as additional physical steps can be added as desired by the user in order to create the desired products, whether that product is a chemical library, a purified solid substrate, or separated liquid bilayers, for example.

In addition to the generation of chemical products, the apparatus can be used for additional liquid handling, agitation, and environmental control tasks as needed in the laboratory.

In one embodiment, the desired product is a library of small molecules synthesized on solid support. Presented here are the physical steps that one can perform on an apparatus of this invention to carry out a generalized protocol for solid phase small molecule synthesis.

B. Small Molecules on Solid Resin Support

Small molecule synthesis on solid support generally consists of carrying out a series of chemical reaction steps where the desired product remains bonded to a large polymer that exists in solid state. This method allows for excess reagent and side products to be easily removed by flushing the resin with clean solvent in the form of a wash step prior to subsequent reaction steps. Following synthesis, the desired product is removed from the solid support through a variety of different methods depending on the type of solid support and the type of the chemical product produced. The general protocol can involve the following physical steps:

1. Deliver to each reaction well 330 a known amount of solid resin usually in the form of small beads (50–250 micron diameter).
2. Wash the resin in each well (each wash step consists of a. deliver liquid to each well, b. agitate, c. drain the liquid from each well, leaving behind the solid resin)
3. Dispense a liquid comprising the chemical reactant in solution form to each well
4. Incubate for a specific duration of time while agitating, controlling the temperature, and controlling the atmosphere of each well.
5. Drain the wells of liquid
6. Wash the resin in each well
7. Repeat steps 3 to 6 as often as needed until the synthesis is complete
8. Remove the product from the solid support and collect the product C. Small Molecules in Solution Phase Reactions Small Molecule Synthesis in Solution Phase Small molecule synthesis in solution phase generally consists of carrying out a series of chemical reaction steps where the desired product remains dissolved in solution throughout the synthesis. In some cases, the product may be precipitated as a solid form in order to extract the product from the surrounding solution. Unlike solid phase synthesis, there is not a solid bead that can easily be identified as containing the product at any given step, so the chemist uses a variety of methods for locating and extracting the desired product both at the end of the synthesis as well as in between individual steps of the synthesis. Though the actual procedures vary from synthesis to synthesis, the general protocol might involve something such as this:

1. Dispense a liquid comprising the chemical reactant in solution form to each well
2. Dispense a second reactant in similar form
3. Incubate (agitate, temperature control, atmosphere control)
4. Dispense a solvent that will form a bilayer (such as with oil and water) where the intermediate product will predominantly exist in one of the two layers.
5. Extract the layer containing the intermediate product
6. Repeat steps 1–5 as needed.

D. Reagent Preparation

Beyond chemical synthesis procedures, the apparatus can be used for a wide variety of other tasks and physical steps required by the laboratory. One example of this is in the area of reagent preparation. Many chemical reagents are delivered in the form of bottles of small powders which prior to use must be dissolved to a specific concentration in a specific solvent. This involves weighing out the reagent on a scale and adding a specific volume of the solvent to the vessel containing the reagent, and then agitating to dissolve the reagent. The apparatus of the invention can be used for some of these steps to assist the user in these mundane tasks, and in fact, reagent preparation can even be added to a longer chemical synthesis method in order to provide fresh reagents during the process of the protocol.

What is claimed is:

1. An apparatus for automated synthesis comprising: a shaker deck comprising a plurality of reaction blocks containing a plurality of reaction wells each reaction block being situated on a turntable each turntable being mounted within said shaker deck, each turntable being further capable of rotating the reaction block along a central axis; wherein the apparatus is optionally controlled by a computer program.

2. The apparatus according to claim 1 wherein there are four reaction blocks in a said shaker deck, each turntable having a universal mount for each reaction block, the said shaker deck further comprising shaker orbital agitation means and means for performing one or more steps selected from the group consisting of drainage, temperature control, pressure control and detection means.

3. The apparatus according to claim 2 wherein said apparatus further comprises means chosen from liquid/liquid extraction, resin washing/workup, resin slurry dispensing, resin cleavage, solvent transfers, reagent transfers, reagent dissolution, temperature control, pressure control and liquid sensing for pipette based separation of liquid phases of different densities.

4. The apparatus according to claim 1 further comprising an arm comprising an array of extending units capable of performing physical steps along a plurality of axes of each reaction block.

5. The apparatus for automated synthesis according to claim 4 wherein the arm is situated on a slidable mount having bidirectional and lateral movement and each turntable is capable of rotating the reaction block up to 90 degrees along a central axis.

6. The apparatus for automated synthesis according to claim 5 wherein the extending units are dispensing modules having dispensing heads capable of delivering an amount of fluid to a well in the reaction block, where the reaction block is situated on the turntable; the dispensing heads being capable of delivering one or more fluids to a single well sequentially or a plurality of wells at a single step.

7. The apparatus for automated synthesis according to claim 6 wherein the movement of the arm mount is a) in an x,y plane of the arm mount and performed by slidable lateral movement means located in an arm unit slot, and b) in a direction perpendicular to the slot by means capable of two way movement of the entire arm mount across the apparatus;

wherein the dispenser head motion by movement of the arm and turntable in relation to reaction wells in the reaction block can be radial, linear or diagonal, or a combination of radial and linear.

8. An apparatus for automated synthesis comprising one or more shaker decks, each shaker deck comprising a plurality of reaction blocks each individually mounted on a turntable, a housing which supports each turntable along a central axis, the housing being fixed along a shaft of moveable support cams at one longitudinal end, which in turn are anchored to the housing at the other longitudinal end, the housing can be shaken by rotation means, wherein the apparatus is optionally controlled by a computer program.

9. The apparatus according to claim 8 further comprising an arm comprising an array of extending units capable of actuating physical steps in planar x, y coordinates and an axis perpendicular to said x,y coordinates of each reaction block.

10. A process of preparing a peptide, oligonucleotide or a small molecule, said process comprising:

providing one or more appropriate reagents necessary for the synthesis of said peptide, oligonucleotide or a small molecule to an apparatus according to claim 1 or 8;

programming a computer which controls the apparatus to be set up and prepared to deliver the appropriate reagents to designated wells in the reaction block in a desired order and adding physical steps to create the peptide, oligonucleotide or a small molecule product.

11. The process according to claim 10 wherein the physical steps are chosen from one or more dispensing, incubating, extracting, washing, draining and agitating steps.

12. The process according to claim 11 wherein one or more physical steps are performed in sequential stations dedicated to fluid delivery, agitation or fluid draining or combinations thereof; or one or more physical steps are performed at a single station the single station dedicated to fluid delivery, agitation or fluid draining or combinations thereof.

* * * * *